US011914320B2

(12) United States Patent
Ishii et al.

(10) Patent No.: US 11,914,320 B2
(45) Date of Patent: Feb. 27, 2024

(54) IMAGE FORMING APPARATUS HAVING TRANSPORT PATH WITH GUIDE UNITS AND GAS GUIDING PART

(71) Applicant: FUJIFILM Business Innovation Corp., Tokyo (JP)

(72) Inventors: Kazunari Ishii, Kanagawa (JP); Koji Yoshitsugu, Kanagawa (JP); Yuta Shimatate, Kanagawa (JP); Shunsuke Yamasaki, Kanagawa (JP); Naoki Sambe, Kanagawa (JP); Yasuhisa Gonda, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/903,579

(22) Filed: Sep. 6, 2022

(65) Prior Publication Data

US 2023/0305453 A1 Sep. 28, 2023

(30) Foreign Application Priority Data

Mar. 25, 2022 (JP) ................................ 2022-050864

(51) Int. Cl.
*G03G 15/00* (2006.01)
*G03G 21/20* (2006.01)
*G03G 15/20* (2006.01)

(52) U.S. Cl.
CPC ....... *G03G 15/6573* (2013.01); *G03G 21/206* (2013.01); *G03G 15/2021* (2013.01);
(Continued)

(58) Field of Classification Search
CPC .......... G03G 15/2021; G03G 15/6573; G03G 21/206; G03G 2221/1645; G03G 2215/00421
(Continued)

(56) References Cited

U.S. PATENT DOCUMENTS 5,325,158 A * 6/1994 Guelfo ................ G03G 21/203 399/92
7,890,014 B2 * 2/2011 Koshida ............ G03G 15/6573 399/92
(Continued)

FOREIGN PATENT DOCUMENTS

JP 2009-122668 A 6/2009
JP 2011-152987 A 8/2011

*Primary Examiner* — Robert B Beatty
(74) *Attorney, Agent, or Firm* — Oliff PLC

(57) ABSTRACT

An image forming apparatus, for forming an image with a fixing unit that fixes a toner image to a recording material and with a first transport path, includes: a first guide unit that guides one side of a recording material discharged from the fixing unit and transported through the first transport path; a second guide unit that guides the other side of the recording material transported thorough the first transport path; a blowing part through which gas is sent to the one side of the recording material transported through the first transport path; and a gas guiding part that faces the second guide unit with the first transport path interposed between the gas guiding part and the second guide unit and that guides, in a direction away from the first transport path, gas that is sent from the blowing part and whose traveling direction is changed by a recording material.

10 Claims, 6 Drawing Sheets

(52) U.S. Cl.
CPC ............ *G03G 2215/00421* (2013.01); *G03G 2221/1645* (2013.01)

(58) Field of Classification Search
USPC .................................................... 399/92, 405
See application file for complete search history.

(56) References Cited

U.S. PATENT DOCUMENTS

| | | | | |
|---|---|---|---|---|
| 8,929,766 | B2 | 1/2015 | Masuda | |
| 9,195,184 | B2 | 11/2015 | Masuda | |
| 2007/0059024 | A1* | 3/2007 | Kitayama | G03G 15/2039 399/92 |
| 2007/0122177 | A1* | 5/2007 | Doi | G03G 21/206 399/93 |
| 2014/0161481 | A1* | 6/2014 | Udagawa | G03G 21/206 399/92 |
| 2018/0231924 | A1* | 8/2018 | Katakura | G03G 15/205 |
| 2020/0073298 | A1* | 3/2020 | Kokubo | G03G 15/2032 |
| 2020/0201238 | A1* | 6/2020 | Kawasumi | G03G 21/0052 |
| 2022/0017317 | A1* | 1/2022 | Tatezawa | G03G 21/206 |

* cited by examiner

IMAGE FORMING APPARATUS HAVING TRANSPORT PATH WITH GUIDE UNITS AND GAS GUIDING PART

CROSS-REFERENCE TO RELATED APPLICATIONS

This application is based on and claims priority under 35 USC 119 from Japanese Patent Application No. 2022-050864 filed Mar. 25, 2022.

BACKGROUND

(i) Technical Field

The present disclosure relates to an image forming apparatus.

(ii) Related Art

Japanese Unexamined Patent Application Publication No. 2011-152987 discloses an image forming apparatus including an upper sheet guide and a lower sheet guide that guide a sheet that has passed through a heat-treatment part. Each of the upper sheet guide and the lower sheet guide of the image forming apparatus has a ventilation part through which cooling gas for cooling the sheet that has passed through the heat-treatment part passes.

SUMMARY

When gas is sent, for a cooling purpose, toward a recording material discharged from a fixing unit and transported through a transport path, the gas that has hit the recording material and whose traveling direction has been changed may cause transport failure of a recording material to be transported next.

Aspects of non-limiting embodiments of the present disclosure relate to decreasing the likelihood of transport failure of a recording material when gas is sent by a blowing part toward a recording material discharged from a fixing unit and transported through a transport path, compared with the case where the gas that has been sent from the blowing part and whose travelling direction has been changed by a recording material is not guided in a direction away from the transport path.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image forming apparatus for forming an image with a fixing unit that fixes a toner image to a recording material and with a first transport path, the image forming apparatus including: a first guide unit that guides one side of a recording material discharged from the fixing unit and transported through the first transport path; a second guide unit that guides the other side of the recording material transported thorough the first transport path; a blowing part through which gas is sent to the one side of the recording material transported through the first transport path; and a gas guiding part that faces the second guide unit with the first transport path interposed between the gas guiding part and the second guide unit and that guides, in a direction away from the first transport path, gas that is sent from the blowing part and whose traveling direction is changed by a recording material.

BRIEF DESCRIPTION OF THE DRAWINGS

An exemplary embodiment of the present disclosure will be described in detail based on the following figures, wherein.

DETAILED DESCRIPTION

Hereinafter, an exemplary embodiment of the present disclosure will be described with reference to the accompanying drawings.

Figure 1:
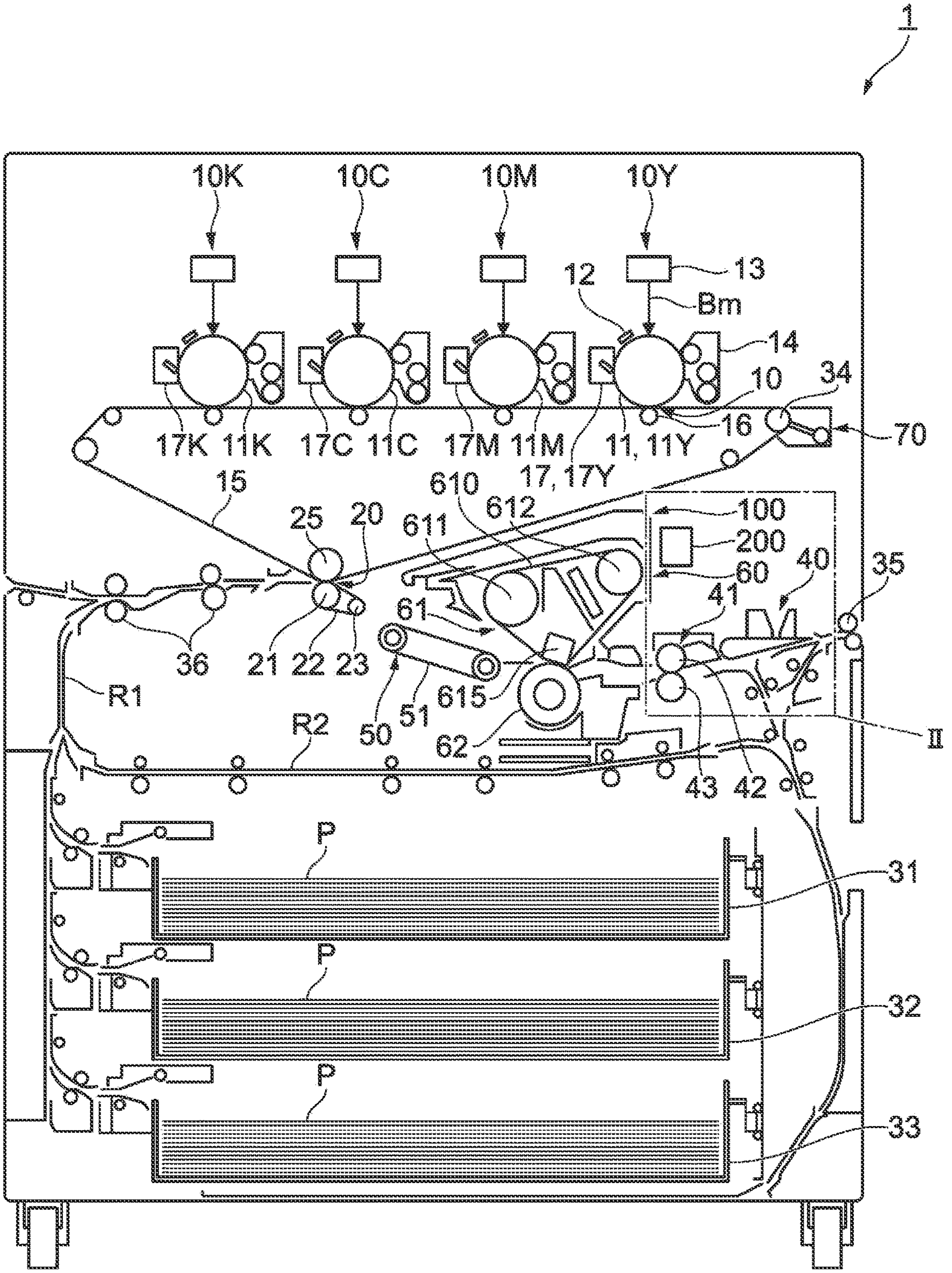
FIG. 1 illustrates schematically the configuration of an image forming apparatus to which the present exemplary embodiment is applied.

FIG. 1 illustrates schematically the configuration of an image forming apparatus 1 to which the present exemplary embodiment is applied.

The image forming apparatus 1 illustrated in FIG. 1 is a so-called tandem image forming apparatus employing an intermediate transfer system. The image forming apparatus 1 includes plural image forming units 10Y, 10M, 10C, and 10K that form, by an electrophotographic system, toner images of the respective color components.

The image forming units 10Y, 10M, 10C, and 10K form respectively images of yellow (Y), magenta (M), cyan (C), and black (K), and, hereinafter, the four colors are sometimes referred to as normal colors.

The image forming apparatus 1 further includes a first transfer part 10 in each of the image forming units 10Y, 10M, 10C, and 10K. The first transfer parts 10 first-transfer toner images of the four color components formed by the respective image forming units 10Y, 10M, 10C, and 10K, onto an intermediate transfer belt 15 in order. The image forming apparatus 1 further includes a second transfer part 20 that second-transfers, in a collective manner, the superimposed toner images that have been transferred onto the intermediate transfer belt 15, onto a sheet P, which is an example of a recording material.

Each of the image forming units 10Y, 10M, 10C, and 10K, which functions as an example of an image forming section, includes the following electrophotographic devices. In the vicinity of a photoconductor drum 11 that is rotated in the clockwise direction in FIG. 1, a charger 12 for charging the photoconductor drum 11 is provided. A laser exposure machine 13 that writes an electrostatic latent image on the photoconductor drum 11 is also provided. Note that an exposure beam emitted by the laser exposure machine 13 is denoted by Bm in FIG. 1. Note that, in the following description, the photoconductor drums 11 provided for the respective image forming units 10Y, 10M, 10C, and 10K are sometimes referred to as the photoconductor drums 11Y, 11M, 11C, and 11K.

There is further provided a developing device 14 in which a developer containing carrier and toner is accommodated and that visualizes, with the toner, the electrostatic latent image on the photoconductor drum 11. There is also provided a first transfer roller 16 that transfers the toner image of a corresponding color formed on the photoconductor drum 11 onto the intermediate transfer belt 15, at the first transfer part 10. In addition, a drum cleaner 17 that removes the residual toner on the photoconductor drum 11 is provided. The drum cleaner 17 is constituted by, for example, a cleaning blade that, while being in contact with the surface of the photoconductor drum 11, scrapes the waste powder containing the residual toner on the surface of the photoconductor drum 11. Note that, in the following description, the drum cleaners 17 provided for the respective image forming units 10Y, 10M, 10C, and 10K are sometimes referred to as the drum cleaners 17Y, 17M, 17C, and 17K.

The intermediate transfer belt 15 is circularly moved in the counterclockwise direction in FIG. 1 at a predetermined speed by a driving roller 34 driven by a motor, which is not illustrated. The first transfer part 10 includes, as a constituent, the first transfer roller 16 disposed so as to face the photoconductor drum 11 with the intermediate transfer belt 15 interposed therebetween. The toner images on the respective photoconductor drums 11 are then electrostatically attracted one by one to the intermediate transfer belt 15, and the superimposed toner images are formed on the intermediate transfer belt 15.

The second transfer part 20 is provided with a second transfer roller 21, a belt member 22, and a support roller 23 that are disposed on the outer circumferential side of the intermediate transfer belt 15, that is, disposed on the side of a toner image holding surface. The second transfer part 20 is further provided with a backup roller 25 disposed on the inner circumferential side of the intermediate transfer belt 15. At the second transfer part 20, the belt member 22 is wound around and supported by the outer circumferential sides of the second transfer roller 21 and the support roller 23. In addition, at the second transfer part 20, the intermediate transfer belt 15 and the belt member 22 are arranged so that the outer circumferential surfaces thereof are in contact with one another. Moreover, at the second transfer part 20, the second transfer roller 21 is disposed so as to press the backup roller 25 with the belt member 22 and the intermediate transfer belt 15 interposed between the second transfer roller 21 and the backup roller 25. The second transfer roller 21 is grounded and forms a second transfer bias between the second transfer roller 21 and the backup roller 25, and the toner images formed on the intermediate transfer belt 15 are second-transferred onto the sheet P that has been transported to the second transfer part 20.

The image forming apparatus 1 further includes a fixing device 60, which is an example of a fixing unit that fixes the second-transferred toner images onto the sheet P.

The fixing device 60 is provided with a fixing belt module 61 and a pressure roller 62 that is pressed against the fixing belt module 61. In the fixing device 60, the sheet P is pressed and heated at a position at which the fixing belt module 61 and the pressure roller 62 are in contact with one another, that is, at a fixing nip part, and the toner images are thus fixed to the sheet P.

The fixing belt module 61 is provided with a fixing belt 610 that is an endless belt, and support rollers 611 and 612 that are rotatably provided and support the fixing belt 610 from the inside of the fixing belt 610. The support roller 611 is rotated in the clockwise direction in FIG. 1 by receiving a driving force from a driving source, which is not illustrated. Due to the rotation of the support roller 611, the fixing belt 610 receives a driving force from the support roller 611 and is circularly moved in the clockwise direction in FIG. 1.

The fixing belt module 61 is further provided with a load receiving member 615 positioned so as to face the pressure roller 62 with the fixing belt 610 interposed between the load receiving member 615 and the pressure roller 62. The load receiving member 615 receives the load from the pressure roller 62. Regarding the fixing device 60 of the present exemplary embodiment, the pressure roller 62 and the load receiving member 615 hold the sheet P from both sides of the sheet P and apply pressure to the sheet P.

The image forming apparatus 1 further includes a transport unit 50 that transports, toward the fixing device 60, the sheet P onto which the toner images have been second-transferred at the second transfer part 20.

The transport unit 50 is provided with a transport belt 51 that is an endless belt, and two support rollers, which are not denoted by references. The support rollers are rotatably provided and support the transport belt 51 from the inside of the transport belt 51. One support roller is rotated in the clockwise direction in FIG. 1 by receiving a driving force from a driving source, which is not illustrated. Due to the rotation of the support roller, the transport belt 51 receives a driving force from the support roller and is circularly moved in the clockwise direction in FIG. 1.

The image forming apparatus 1 further includes a cleaning device 70 that cleans a surface of the intermediate transfer belt 15. The cleaning device 70 cleans the waste powder containing the residual toner on the surface of the intermediate transfer belt 15.

The image forming apparatus 1 further includes a transport roller pair 41 that is constituted by a pair of rotatably provided transport rollers 42 and 43 and that transports the sheet P discharged from the fixing device 60 further downstream, and the image forming apparatus 1 also includes a guide section 40 that guides the sheet P transported by the transport roller pair 41.

The image forming apparatus 1 further includes a sheet discharge part 35 that discharges, outside the image forming apparatus 1, the sheet P that has passed through the guide section 40.

Note that the configuration of the guide section 40 will be described in detail later.

The image forming apparatus 1 further includes: a sheet transport path R1 through which sheets are transported from sheet accommodation parts 31, 32, and 33 so as to pass through the second transfer part 20, the transport unit 50, and the fixing device 60; a sheet inversion path R2 on which the sheet P that has been discharged from the fixing device 60 and has passed through the transport roller pair 41 is turned upside down and is transported toward the second transfer part 20 again; and a sheet discharge path R3 (refer to FIG. 2, which will be described later) through which the sheet P that has been discharged from the fixing device 60 and has passed through the transport roller pair 41 is transported toward the sheet discharge part 35.

The image forming apparatus 1 further includes a blowing mechanism 100 through which gas for cooling the heat discharged from the fixing device 60 and the sheet P heated at the fixing device 60 circulates.

The image forming apparatus 1 further includes an exhaust mechanism 200 disposed, relative to the fixing device 60, downstream in the transport direction of a sheet P in the fixing device 60 in an adjacent manner and being an example of an exhaust part that sucks air in the vicinity of the fixing device 60 and discharges the air outside the image forming apparatus 1.

The transport direction of a sheet P in the fixing device 60 is sometimes referred to simply as the transport direction of a sheet P or the transport direction.

The exhaust mechanism 200 sucks gas from a space positioned downstream, of the fixing device 60, in the transport direction and discharges the gas outside the image forming apparatus 1, thereby cooling the sheet P discharged from the fixing device 60 and cooling the vicinity of the fixing device 60. The exhaust mechanism 200 is provided above the transport roller pair 41 in the space positioned downstream of the fixing device 60 in the transport direction.

The exhaust mechanism 200 has a duct 210 (refer to FIG. 2), extending in the depth direction, having a cuboid shape, and including a space through which gas circulates and a suction port 211 (refer to FIG. 2) through which gas is sucked into the space formed inside the duct 210. The suction port 211 is open downward in the gravity direction, toward the transport roller pair 41. Although not being illustrated, a suction fan is provided in the exhaust mechanism 200. The suction fan is driven to rotate by a driving source, which is not illustrated, and thus sucks gas, through the suction port 211, into the space formed inside the duct 210.

Regarding the exhaust mechanism 200, by the suction fan, which is not illustrated, being rotated, gas is sucked through the suction port 211 into the inside space of the duct 210, from the space positioned downstream of the fixing device 60 in the transport direction, that is, more specifically, a space in the vicinity of the transport roller pair 41 through which the sheet P discharged from the fixing device 60 is transported. The gas that has been sucked inside the duct 210 circulates in the duct 210 in the depth direction and is then discharged outside the image forming apparatus 1 through an exhaust port, which is not illustrated. In this way, the exhaust mechanism 200 discharges the high-temperature gas existing in the vicinity of the fixing device 60 outside the image forming apparatus 1, thereby cooling the fixing device 60 and the vicinity of the fixing device 60. In addition, the high-temperature sheet P discharged from the fixing device 60 and transported by the transport roller pair 41 is cooled.

The basic image formation processing of the image forming apparatus 1 will be described.

In the image forming apparatus 1, image data is output from, for example, an image reading device, which is not illustrated. The image data is then subjected to image processing performed by an image processing device, which is not illustrated. The image data is converted into color material gradation data of four colors: Y, M, C, and K and output to the laser exposure machines 13.

Regarding each of the laser exposure machines 13, the photoconductor drum 11 of a corresponding one of the image forming units 10Y, 10M, 10C, and 10K is radiated with the exposure beam Bm emitted from, for example, a semiconductor laser, according to the input color material gradation data. At each of the photoconductor drums 11, after the charger 12 has charged the surface of the photoconductor drum 11, the surface of the photoconductor drum 11 is scanned and exposed by the laser exposure machine 13, and an electrostatic latent image is thus formed. Then, after a toner image has been formed on each of the photoconductor drums 11 by the corresponding developing device 14, the toner images are transferred onto the intermediate transfer belt 15 at the first transfer part 10 at which each of the photoconductor drums 11 and the intermediate transfer belt 15 are in contact with one another.

After the toner images have been first-transferred onto the surface of the intermediate transfer belt 15, the toner images are transported to the second transfer part 20 by the intermediate transfer belt 15 being moved. At the second transfer part 20, the second transfer roller 21 is pressed against the backup roller 25 with the belt member 22 and the intermediate transfer belt 15 interposed therebetween. At this time, the sheet P that has been transported from any one of the sheet accommodation parts 31, 32, and 33 by, for example, a transport roller 36 is held between the intermediate transfer belt 15 and the belt member 22.

The unfixed toner images held on the intermediate transfer belt 15 are then electrostatically transferred onto the sheet P in a collective manner at the second transfer part 20. Subsequently, the sheet P onto which the toner images have been electrostatically transferred is separated from the intermediate transfer belt 15 and is then transported to the transport unit 50 provided downstream, in the sheet transport direction, of the second transfer part 20. The sheet P that has been transported to the transport unit 50 is then transported to the fixing device 60 by the transport belt 51.

The fixing device 60 applies heat and pressure to the toner images on the sheet P that has been transported to the fixing device 60 and fixes the toner images onto the sheet P. The sheet P on which such a fixed image has been formed is then transported by the transport roller pair 41 to pass through the guide section 40 and is discharged outside the image forming apparatus 1 through the sheet discharge part 35.

On the other hand, the waste powder containing the toner adhering to each of the photoconductor drums 11 after the first transfer is removed by the corresponding drum cleaner 17. In addition, the waste powder containing the toner adhering to the intermediate transfer belt 15 after the second transfer is removed by the cleaning device 70.

In this way, regarding the image formation processing at the image forming apparatus 1, the cycle is repeated as many times as the number of prints.

Figure 2:
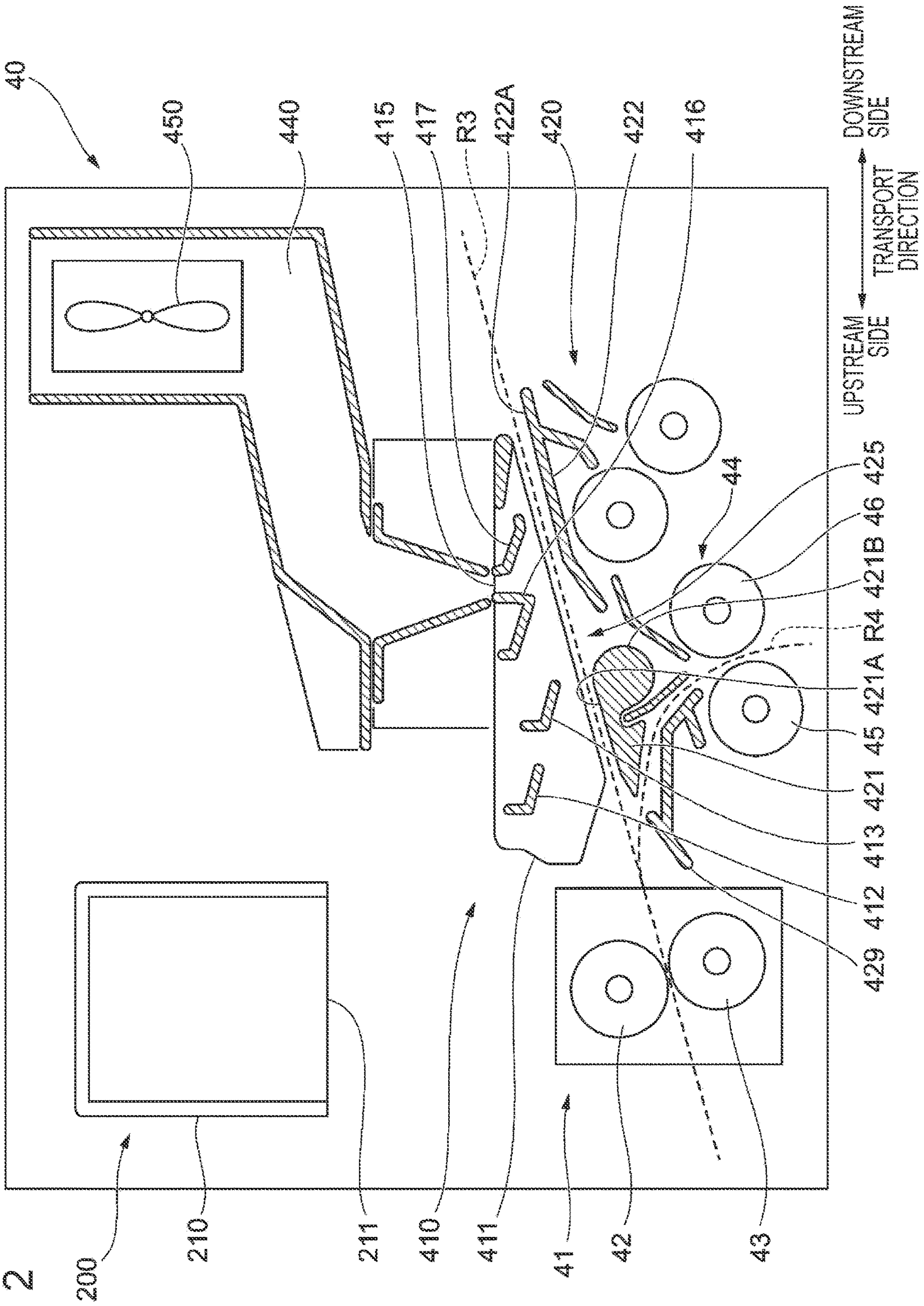
FIG. 2 is an enlarged view of part II in the image forming apparatus illustrated in FIG. 1.
Figure 3:
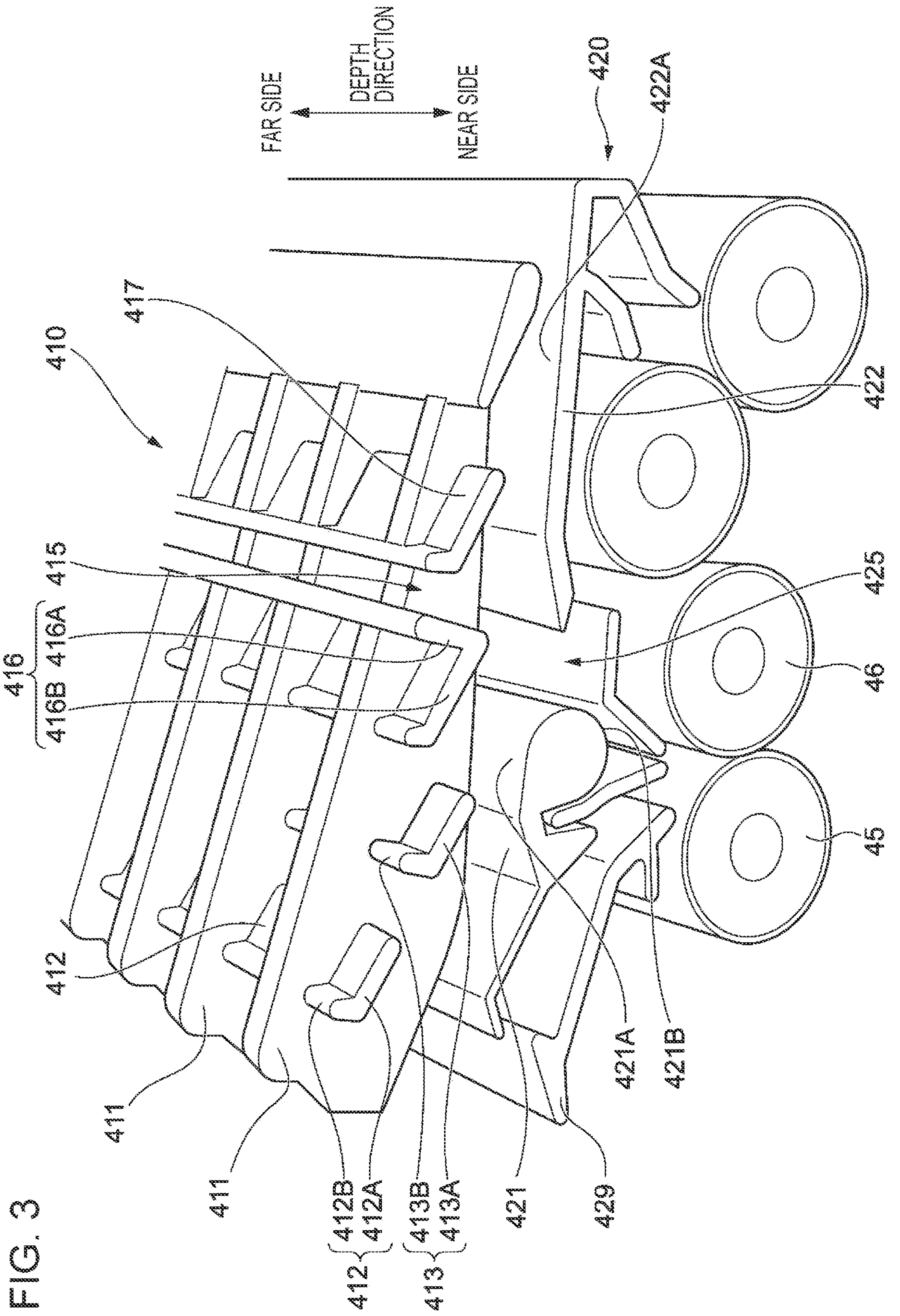
FIG. 3 is a top view of a guide section.

Next, the guide section 40 of the present exemplary embodiment will be described. FIG. 2 is an enlarged view of part II in the image forming apparatus 1 illustrated in FIG. 1. FIG. 3 is a top view of the guide section 40. Note that, a fan 450 and a flow passage part 440 of the guide section 40, which are described later, are omitted from FIG. 3.

The guide section 40 of the present exemplary embodiment is provided with a first guide part 410 that guides one side of the sheet P transported through the sheet discharge path R3, which is an example of a first transport path, and a second guide part 420 that guides the other side of the sheet P transported through the sheet discharge path R3. The guide section 40 further has the fan 450 that produces the flow of gas for cooling the sheet P transported through the sheet discharge path R3 and also has the flow passage part 440 serving as a flow passage for the flow of gas produced by the fan 450.

In the guide section 40 of the present exemplary embodiment, the first guide part 410 and the second guide part 420 are provided so as to face one another with the sheet discharge path R3 interposed therebetween. Specifically, the first guide part 410 is disposed above the sheet discharge path R3 in the gravity direction. The second guide part 420 is disposed below the sheet discharge path R3 in the gravity direction.

The first guide part 410, which is an example of a first guide unit, guides the sheet P discharged from the fixing device 60 and transported through the sheet discharge path R3 by the transport roller pair 41, more specifically, guides one side of the sheet P to which a toner image has been fixed by fixing device 60.

The first guide part 410 has plural guide plates 411 each of which is constituted by a plate-shaped member extending in the transport direction of the sheet P and in the gravity direction and that guide the one side of the sheet P transported through the sheet discharge path R3. As FIG. 3 illustrates, the plural guide plates 411 are arranged in the depth direction of the image forming apparatus 1 (refer to FIG. 1) with a gap interposed therebetween.

The first guide part 410 further has a vent 415, which is an example of a blowing part through which the gas whose flow is produced by the fan 450 and that is discharged through the flow passage part 440 is sent toward the sheet discharge path R3. In this example, the vent 415 is formed between two guide plates 411 adjacent to one another in the depth direction.

The first guide part 410 further has a first gas guiding rib 412 and a second gas guiding rib 413 that are collectively an example of a gas guiding part disposed between two guide plates 411 adjacent to one another in the depth direction. Each of the first gas guiding ribs 412 and the corresponding second gas guiding rib 413 are arranged side by side from the upstream side to the downstream side in the transport direction of the sheet P with a gap interposed therebetween. Each of the first gas guiding ribs 412 and the second gas guiding ribs 413 has a plate shape extending in a direction orthogonal to the guide plates 411.

Although the details will be described later, each of the first gas guiding ribs 412 and the second gas guiding ribs 413 has a function of guiding the gas that has been sent to, through the vents 415, the sheet P transported on the sheet discharge path R3, in a direction away from the sheet discharge path R3.

The first gas guiding rib 412 has an extending part 412A extending upward in the gravity direction as approaching the upstream side in the transport direction of the sheet P and a protruding part 412B protruding upward in the gravity direction from an end portion, of the extending part 412A, on the upstream side in the transport direction. Specifically, the extending part 412A of the first gas guiding rib 412 extends in a direction away from the sheet discharge path R3 as approaching the upstream side in the transport direction.

Similarly, the second gas guiding rib 413 has an extending part 413A extending upward in the gravity direction as approaching the upstream side in the transport direction of the sheet P and a protruding part 413B protruding upward in the gravity direction from an end portion, of the extending part 413A, on the upstream side in the transport direction. Specifically, the extending part 413A of the second gas guiding rib 413 extends in a direction away from the sheet discharge path R3 as approaching the upstream side in the transport direction.

In the present exemplary embodiment, the first gas guiding rib 412 and the second gas guiding rib 413 constitute plural guide members arranged side by side with a gap interposed therebetween.

The first guide part 410 further has an upstream ventilation rib 416 and a downstream ventilation rib 417 that are provided below the corresponding vent 415 in the gravity direction and that guide, toward the sheet discharge path R3, the gas discharged through the vent 415. Each of the upstream ventilation ribs 416 and the corresponding downstream ventilation rib 417 are arranged in the transport direction with the vent 415 interposed therebetween. Each of the upstream ventilation ribs 416 and the downstream ventilation ribs 417 has a plate shape extending in the direction orthogonal to the guide plates 411.

The upstream ventilation rib 416 is provided upstream of the vent 415 in the transport direction. The upstream ventilation rib 416 has a first extending part 416A extending in the gravity direction from the vent 415 toward the sheet discharge path R3 and a second extending part 416B extending, from a lower end portion of the first extending part 416A, upward in the gravity direction as approaching the upstream side in the transport direction of the sheet P.

The downstream ventilation rib 417 is provided downstream of the vent 415 in the transport direction. The downstream ventilation rib 417 extends downward in the gravity direction as approaching the downstream side in the transport direction of the sheet P. Specifically, the downstream ventilation rib 417 extends toward the sheet discharge path R3 as approaching the downstream side in the transport direction of the sheet P.

The second guide part 420 guides the sheet P discharged from the fixing device 60 and transported through the sheet discharge path R3 by the transport roller pair 41, more specifically, guides the other side of the sheet P opposite to the one side of the sheet P to which a toner image has been fixed by the fixing device 60.

The second guide part 420 further has a vent 425. The gas, whose flow is produced by the fan 450, sent to the sheet discharge path R3 through the flow passage part 440 and through the vents 415 of the first guide part 410 passes through the vent 425. The vent 425 is provided between an upstream guide member 421 and a downstream guide member 422. The gas sent to the sheet discharge path R3 passes through the vent 425 in the case where the other side of the sheet P is not guided by the second guide part 420.

The vent 425 may be provided to face the vents 415 of the first guide part 410 with the sheet discharge path R3 interposed therebetween. Specifically, the vent 425 may be provided on the extension of the traveling route of the gas sent from the vents 415 of the first guide part 410 to the sheet discharge path R3.

The second guide part 420 is further provided with the upstream guide member 421 that guides the other side of the sheet P transported through the sheet discharge path R3. The upstream guide member 421 faces the guide plates 411 of the first guide part 410 with the sheet discharge path R3 interposed therebetween. In this example, the upstream guide member 421 also faces the first gas guiding ribs 412 and the second gas guiding ribs 413 of the first guide part 410, with the sheet discharge path R3 and gaps left between the guide plates 411 of the first guide part 410 interposed therebetween.

The upstream guide member 421 has a sheet guiding surface 421A that faces the guide plates 411 of the first guide part 410 with the sheet discharge path R3 interposed therebetween and that extends in the depth direction and in the transport direction of the sheet P. By the sheet guiding surface 421A being in contact with the other side of the sheet P, the upstream guide member 421 guides, with the sheet guiding surface 421A, the other side of the sheet P transported through the sheet discharge path R3.

The upstream guide member 421 further has a gas guiding surface 421B that extends downward in the gravity direction from an edge portion, of the sheet guiding surface 421A, on the downstream side in the transport direction and that guides the gas that has passed through the vent 425. The gas guiding surface 421B guides the gas that has passed through the vent 425, toward a branch path R4, which will be described later.

The second guide part 420 is further provided with the downstream guide member 422 that guides the other side of the sheet P transported through the sheet discharge path R3 and guided by the upstream guide member 421. The downstream guide member 422 is disposed downstream of the upstream guide member 421 in the transport direction of the sheet P. The downstream guide member 422 faces the guide plates 411 of the first guide part 410 with the sheet discharge path R3 interposed therebetween.

The downstream guide member 422 has a sheet guiding surface 422A that faces the guide plates 411 of the first guide part 410 with the sheet discharge path R3 interposed therebetween and that extends in the depth direction and in the transport direction of the sheet P. By the sheet guiding surface 422A being in contact with the other side of the sheet P, the downstream guide member 422 guides, with the sheet guiding surface 422A, the other side of the sheet P transported through the sheet discharge path R3.

The second guide part 420 further has a transport guide member 429 disposed, relative to the upstream guide member 421, upstream in the transport direction and below in the gravity direction in an adjacent manner, and the sheet P is transported between the upstream guide member 421 and the transport guide member 429.

In the second guide part 420, between the upstream guide member 421 and the transport guide member 429, the branch path R4 that branches from the sheet discharge path R3 and through which the sheet P is transported toward the sheet inversion path R2 (refer to FIG. 1) is formed.

In addition, paired transport rollers 45 and 46 that transport the sheet P through the branch path R4 are provided, in the second guide part 420, below the upstream guide member 421 in the gravity direction.

The fan 450 is rotated by a driving source, which is not illustrated, and takes in air from the outside of the image forming apparatus 1 to produce the flow of such a gas flowing from the flow passage part 440, through the vents 415 of the first guide part 410, toward the sheet discharge path R3. The structure of the fan 450 is not particularly limited, and the fan 450 may have any structure capable of producing the flow of gas. For example, a known fan such as a sirocco fan or a propeller fan may be used.

In this example, the fan 450 is disposed in an upper region of the flow passage part 440.

The flow passage part 440 guides the flow of gas produced by the fan 450 to the vents 415 of the first guide part 410. The flow passage part 440 is provided continuously from and positioned above the vents 415 of the first guide part 410 in the gravity direction. Regarding the flow passage part 440, the area of a flow passage in which gas circulates decreases toward the vents 415 of the first guide part 410, from the upper side toward the lower side in the gravity direction.

Next, the flow of the gas in the vicinities of the sheet discharge path R3 and the guide section 40 will be described. In the present exemplary embodiment, there is a difference in the way the gas moves in the vicinities of the sheet discharge path R3 and the guide section 40, between the case where the sheet P is transported on the sheet discharge path R3 positioned between the first guide part 410 and the second guide part 420 and the case where no sheet P is transported on the sheet discharge path R3.

Figure 4:
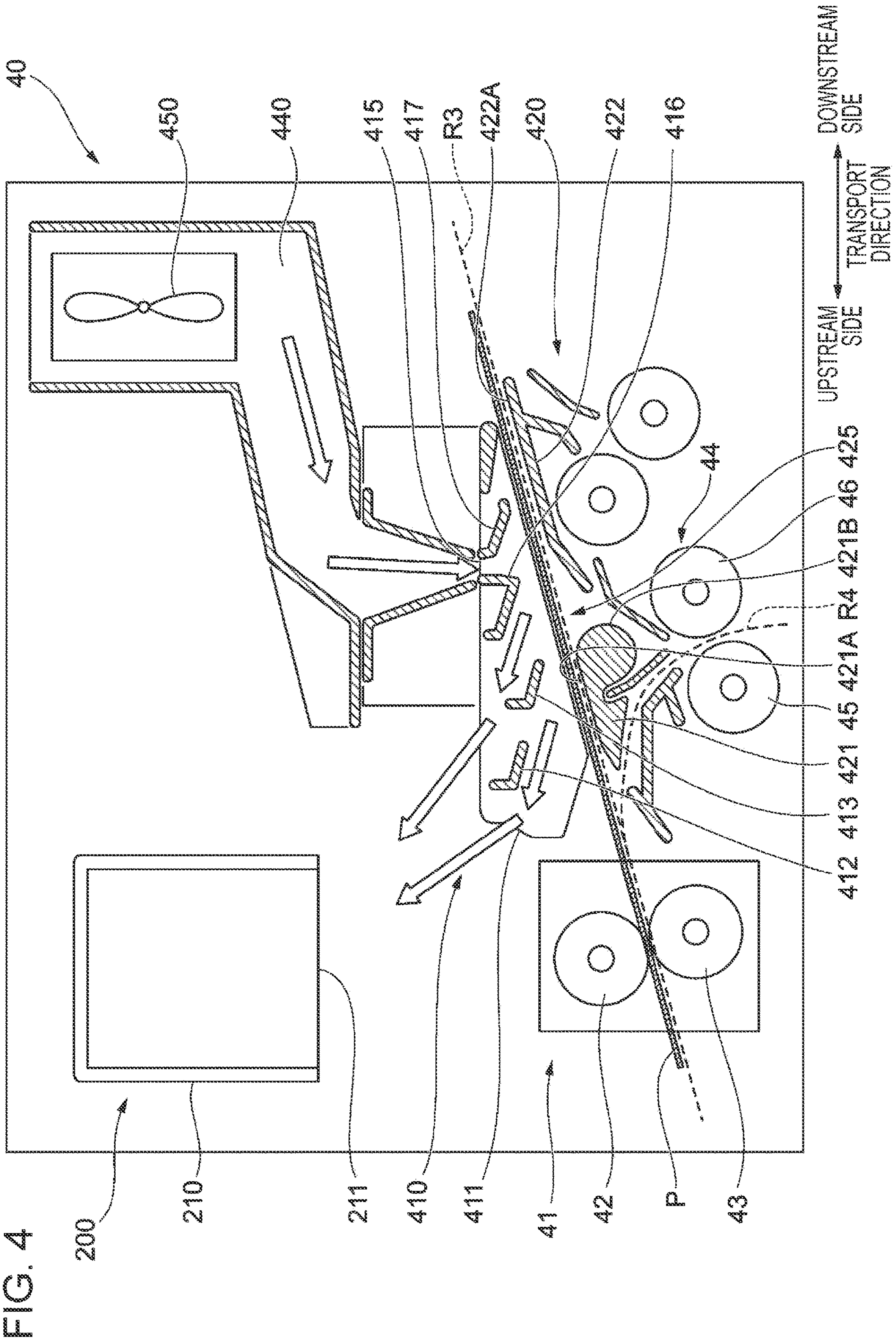
FIG. 4 illustrates the flow of gas in the case where a sheet is transported on a sheet discharge path.
Figure 5:
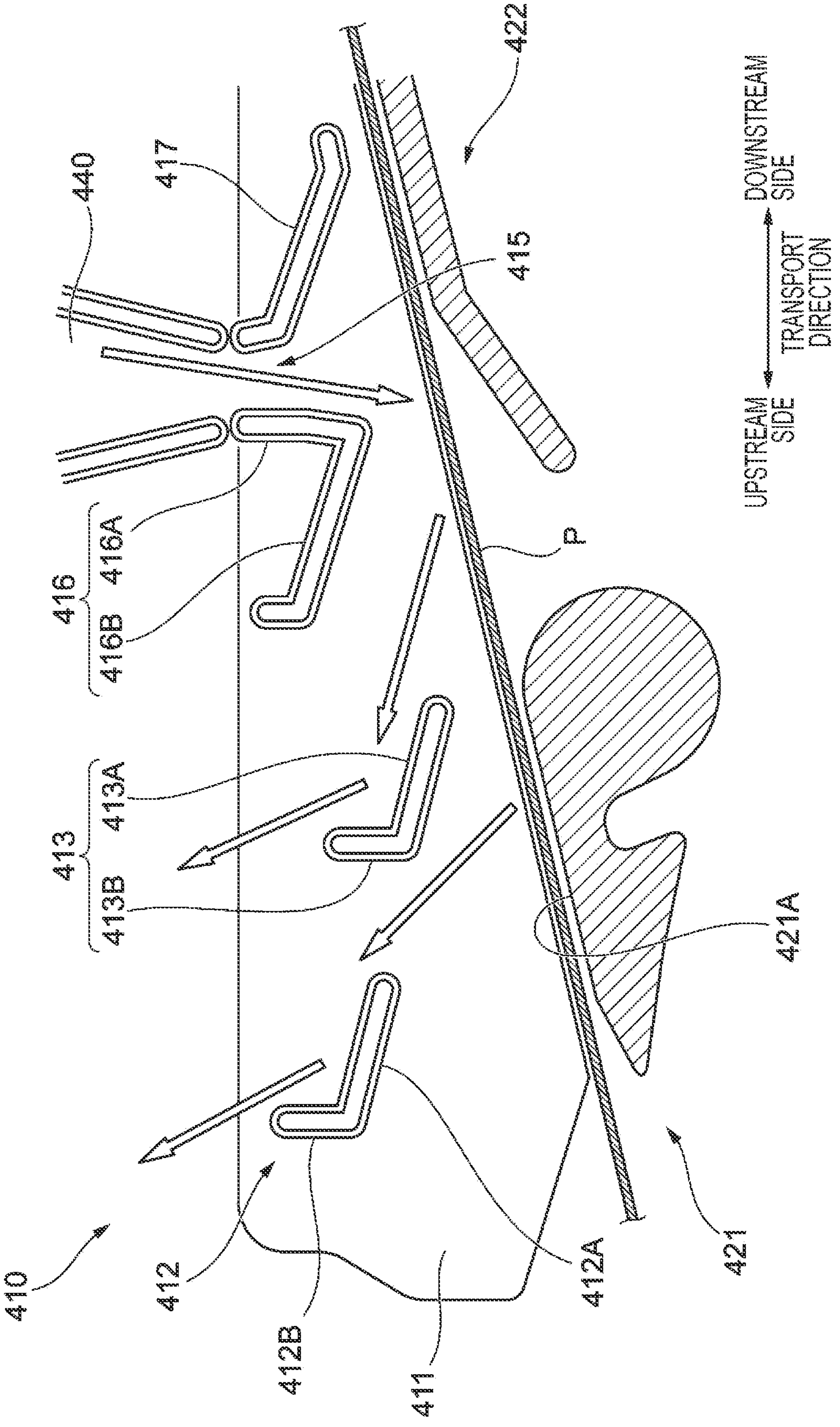
FIG. 5 is an enlarged view of the vicinity of the guide section in FIG. 4.

First, the flow of the gas in the vicinities of the sheet discharge path R3 and the guide section 40 in the case where the sheet P is transported on the sheet discharge path R3 will be described. FIG. 4 illustrates the flow of the gas in the case where the sheet P is transported on the sheet discharge path R3. FIG. 5 is an enlarged view of the vicinity of the guide section 40 in FIG. 4. Note that, hereinafter, the flow of gas generated by the rotation of the fan 450 is sometimes referred to simply as a gas flow.

As FIG. 4 illustrates, the gas flow generated by the rotation of the fan 450, after passing through the flow passage part 440, is discharged through the vents 415 of the first guide part 410 toward the sheet discharge path R3 positioned between the first guide part 410 and the second guide part 420. Specifically, through the vents 415, the gas flow generated by the rotation of the fan 450 is discharged downward in the gravity direction, toward the sheet discharge path R3.

As describe above, the sheet P is transported through the sheet discharge path R3 with one side to which a toner image is fixed by the fixing device 60 (refer to FIG. 1) facing upward. The gas that has been discharged through the vents 415 of the first guide part 410 toward the sheet discharge path R3 is blown against the one side of the sheet P transported on the sheet discharge path R3. Thus, the gas blown against the sheet P cools the sheet P that has been heated by the fixing device 60.

In addition, in the guide section 40 of the present exemplary embodiment, as described above, the gas that has been discharged through the vents 415 of the first guide part 410 is blown against the one side of the sheet P to which a toner image is fixed by the fixing device 60. Thus, the toner image may be suppressed from being scratched by rubbing against the guide plates 411 of the first guide part 410.

Here, in the guide section 40 of the present exemplary embodiment, the gas is discharged toward the sheet discharge path R3 through the vents 415 formed in the first guide part 410 that guides one side of the sheet P, and the gas is blown against the one side of the sheet P. By such a configuration being adopted, it may be possible to blow the gas against the one side of the sheet P at a position near the sheet P, compared with the case where, for example, the gas is blown against the one side of the sheet P at a position outside the first guide part 410. Thus, the efficiency in cooling the sheet P may be increased.

In addition, in the guide section 40 of the present exemplary embodiment, the first guide part 410 has, below the vents 415, the upstream ventilation ribs 416 and the downstream ventilation ribs 417. In the guide section 40, the gas discharged through each of the vents 415 is guided to the first extending part 416A of the corresponding upstream ventilation rib 416 and the corresponding downstream ventilation rib 417 and blown against one side of the sheet P. By such a configuration being adopted, it may be possible to blow the gas against the sheet P at a position near the sheet P, compared with the case where, for example, the first guide part 410 does not have the upstream ventilation rib 416 or the downstream ventilation rib 417. Thus, the efficiency in cooling the sheet P may be increased.

As FIG. 4 and FIG. 5 illustrate, a portion of the gas discharged through the vents 415 and blown against one side of the sheet P bounces off the one side of the sheet P, and the traveling direction thereof is changed.

In the guide section 40 of the present exemplary embodiment, the gas whose traveling direction has been changed by the one side of the sheet P is guided in a direction away from the sheet discharge path R3 by the first gas guiding ribs 412 and the second gas guiding ribs 413 formed in the first guide part 410. Specifically, the gas whose traveling direction has been changed by the one side of the sheet P moves along the extending parts 412A of the first gas guiding ribs 412 and the extending parts 413A of the second gas guiding ribs 413, thereby being guided upstream in the transport direction and upward in the gravity direction so as to move away from the sheet discharge path R3.

Here, in the case where the gas whose traveling direction has been changed by the one side of the sheet P, for example, moves upstream in the transport direction and along the sheet discharge path R3, the gas is blown against another sheet to be transported subsequently after the sheet P, and transport failure of the sheet may be caused.

In contrast, in the present exemplary embodiment, the first gas guiding ribs 412 and the second gas guiding ribs 413 guide the gas whose traveling direction has been changed by the one side of the sheet P, in a direction away from the sheet discharge path R3, and transport failure of another sheet to be transported subsequently after the sheet P may thereby be suppressed from being caused.

In addition, in the present exemplary embodiment, as figures such as FIG. 4 illustrate, the duct 210 of the exhaust mechanism 200 is disposed, relative to the first guide part 410 of the guide section 40, upstream in the transport direction of the sheet P and above in the gravity direction. A portion of the gas whose traveling direction has been changed by the one side of the sheet P is guided toward the suction port 211 of the duct 210 by the first gas guiding ribs 412 and the second gas guiding ribs 413.

Thus, the gas having a high temperature due to the contact with the one side of the sheet P may be easily discharged outside the image forming apparatus 1 through the exhaust mechanism 200, and the temperature inside the image forming apparatus 1 may be suppressed from being increased.

In addition, regarding the first guide part 410 of the present exemplary embodiment, the first gas guiding rib 412 has the protruding part 412B protruding upward in the gravity direction from the end portion of the extending part 412A. Similarly, the second gas guiding rib 413 has the protruding part 413B protruding upward in the gravity direction from the end portion of the extending part 413A. By such a configuration being adopted, the gas whose traveling direction has been changed by the one side of the sheet P may be easily guided to the duct 210 of the exhaust mechanism 200 positioned above the first guide part 410, compared with the case where the first gas guiding rib 412 has no protruding part 412B, and the second gas guiding rib 413 has no protruding part 413B. Thus, the gas having a high temperature due to the contact with the one side of the sheet P may be easily discharged outside the image forming apparatus 1 through the exhaust mechanism 200.

In addition, in the present exemplary embodiment, on the upstream side in the transport direction of the guide section 40, the transport roller pair 41, which is an example of a transport part that transports the sheet P toward the guide section 40 is provided. Specifically, in the present exemplary embodiment, the transport roller pair 41 is provided between the fixing device 60 (refer to FIG. 1) and the guide section 40.

Thus, the gas whose traveling direction has been changed by the one side of the sheet P may be suppressed from flowing into the side of the image forming unit of the image forming apparatus 1 (refer to FIG. 1) by being blocked by the transport roller pair 41. Consequently, the gas having a high temperature due to the contact with the one side of the sheet P may be suppressed from increasing the temperature of the image forming unit.

Moreover, the gas whose traveling direction has been changed by the one side of the sheet P is blown against the transport roller pair 41, and it may thereby be possible to decrease the temperatures of the high-temperature transport rollers 42 and 43, which constitute the transport roller pair 41. Thus, the efficiency in cooling the sheet P transported toward the guide section 40 by the transport roller pair 41 may be increased.

Figure 6:
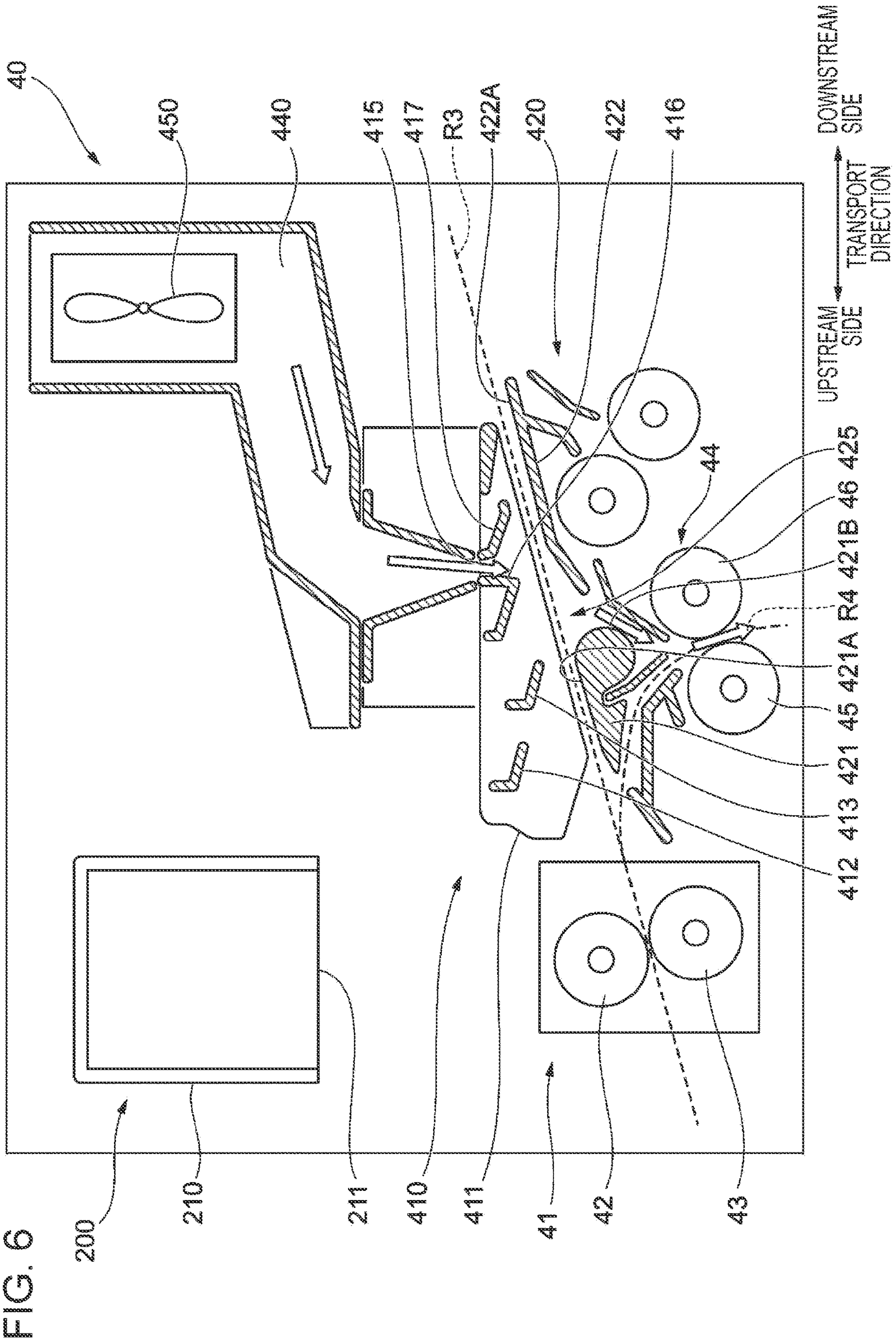
FIG. 6 illustrates the flow of gas in the case where no sheet is transported on the sheet discharge path.

Next, the flow of the gas in the vicinities of the sheet discharge path R3 and the guide section 40 in the case where no sheet P is transported on the sheet discharge path R3 will be described. FIG. 6 illustrates the flow of the gas in the case where the sheet P (refer to FIG. 4) is not transported on the sheet discharge path R3.

As FIG. 6 illustrates, the gas flow generated by the rotation of the fan 450, after passing through the flow passage part 440, is discharged through the vents 415 of the first guide part 410 toward the sheet discharge path R3 positioned between the first guide part 410 and the second guide part 420.

In the case where no sheet P is transported on the sheet discharge path R3, the gas that has been discharged through the vents 415 of the first guide part 410 toward the sheet discharge path R3 reaches the second guide part 420. As FIG. 6 illustrates, the gas that has reached the second guide part 420 then passes through the vent 425 formed between the upstream guide member 421 and the downstream guide member 422 of the second guide part 420 and is guided in a direction away from the sheet discharge path R3.

By such a configuration being adopted, the gas that has been discharged to the sheet discharge path R3 through the vents 415 of the first guide part 410 may be suppressed from moving upstream in the transport direction and along the sheet discharge path R3. Thus, the gas may be suppressed from being blown against another sheet to be transported next, and transport failure of the sheet to be transported next may be suppressed from being caused.

Specifically, in the second guide part 420 of the present exemplary embodiment, the gas that has passed through the vent 425 moves along the gas guiding surface 421B formed as a surface of the upstream guide member 421 and is guided far inside the image forming apparatus 1 so as to move away from the sheet discharge path R3.

By such a configuration being adopted, turbulence of gas may hardly be caused in the vicinity of the sheet discharge path R3, and transport failure of another sheet to be transported next may be further suppressed from being caused.

Furthermore, in the second guide part 420 of the present exemplary embodiment, the gas that has passed through the vent 425 moves along the gas guiding surface 421B formed as a surface of the upstream guide member 421 and is guided to the branch path R4.

By such a configuration being adopted, the gas that has been guided to the branch path R4 may cool the sheet P that is transported through the branch path R4, for example, after passing the fixing device 60. Thus, the sheet P sent to the second transfer part 20 through the branch path R4 and the sheet inversion path R2 may be suppressed from increasing the temperature inside the image forming apparatus 1. In addition, the water vapor that is generated by the high-temperature sheet P may be suppressed from building up around the branch path R4 and causing condensation.

The exemplary embodiment of the present disclosure has so far been described; however, the configurations described above are not limited to the configurations of the above-described exemplary embodiment and modification thereof and may be changed appropriately without departing from the spirit of the present disclosure. In other words, it is to be understood that the forms and the details may be variously changed without departing from the spirit and the scope of the claims.

For example, regarding each of the above-described configurations, a part may be omitted, or another function may be added.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image forming apparatus for forming an image with a fixing unit that fixes a toner image to a recording material and with a first transport path, the image forming apparatus comprising:

a first guide unit that guides one side of a recording material discharged from the fixing unit and transported through the first transport path;

a second guide unit that guides the other side of the recording material transported thorough the first transport path;

a blowing part through which gas is sent to the one side of the recording material transported through the first transport path; and a gas guiding part that faces the second guide unit with the first transport path interposed between the gas guiding part and the second guide unit and that guides, in a direction away from the first transport path and upstream from the blowing part relative to a transport direction of the first transport path, gas that is sent from the blowing part and whose traveling direction is changed by a recording material.

2. The image forming apparatus according to claim 1, wherein the second guide unit has a vent part through which gas sent from the blowing part passes.

3. The image forming apparatus according to claim 2, wherein the vent part guides gas sent from the blowing part, to an inner region of the image forming apparatus.

4. The image forming apparatus according to claim 3, wherein the vent part guides gas sent from the blowing part to a second transport path for transporting a recording material transported through the first transport path, upstream of the fixing unit in the transport direction.

5. The image forming apparatus according to claim 1, further comprising:

an exhaust part through which gas inside a body of the image forming apparatus is discharged outside the body of the image forming apparatus, wherein the gas guiding part guides gas toward the exhaust part.

6. The image forming apparatus according to claim 5, wherein the gas guiding part includes a plurality of guide members extending from a side of the first transport path toward the exhaust part and arranged side by side with a gap interposed between adjacent guide members.

7. The image forming apparatus according to claim 1, further comprising:

a transport part that is provided between the fixing unit and the gas guiding part and transports a recording material discharged from the fixing unit, toward the first transport path.

8. The image forming apparatus according to claim 1, wherein the first guide unit faces the second guide unit with the first transport path interposed between the first guide unit and the second guide unit, and wherein the blowing part sends gas from the first guide unit toward the second guide unit.

9. The image forming apparatus according to claim 8, wherein the blowing part sends gas to the one side, of the recording material, to which a toner image is fixed by the fixing unit.

10. An image forming apparatus for forming an image with fixing means for fixing a toner image to a recording material and with a transport path, the image forming apparatus comprising:

first guide means for guiding one side of a recording material discharged from the fixing means and transported through the transport path;

second guide means for guiding the other side of the recording material transported thorough the transport path;

blowing means through which gas is sent to the one side of the recording material transported through the transport path; and gas guiding means that faces the second guide means with the transport path interposed between the gas guiding means and the second guiding means and that guides, in a direction away from the transport path and upstream from the blowing means relative to a transport direction of the transport path, gas that is sent from the blowing means and whose traveling direction is changed by a recording material.

* * * * *